US005327169A

United States Patent [19]

Thompson

[11] Patent Number: 5,327,169

[45] Date of Patent: Jul. 5, 1994

[54] MASKED MAGNETIC BRUSH DIRECT WRITING FOR HIGH SPEED AND COLOR PRINTING

[75] Inventor: Michael D. Thompson, Rochester, N.Y.

[73] Assignee: Xerox Corporation, Stamford, Conn.

[21] Appl. No.: 925,002

[22] Filed: Aug. 5, 1992

[51] Int. Cl.[5] .......... G01D 15/06

[52] U.S. Cl. .......... 346/155

[58] Field of Search .......... 346/155

[56] References Cited

U.S. PATENT DOCUMENTS 3,689,935 9/1972 Pressman et al. .......... 346/74 ES
4,491,855 1/1985 Fujii et al. .......... 346/159
4,568,955 2/1986 Hosoya et al. .......... 346/153.1
4,755,837 7/1988 Schmidlin et al. .......... 346/155
4,814,796 3/1989 Schmidlin .......... 346/155
5,235,354 8/1993 Larson .......... 346/155 X

*Primary Examiner*—George H. Miller, Jr.

[57] ABSTRACT

Direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign. To this end, the developer delivery system is conventional magnetic brush which delivers toner directly to the printhead structure.

4 Claims, 2 Drawing Sheets

MASKED MAGNETIC BRUSH DIRECT WRITING FOR HIGH SPEED AND COLOR PRINTING

BACKGROUND OF THE INVENTION

This invention relates to a direct electrostatic printing device and more particularly to a developer or toner delivery system for presenting developer or toner to an electronically addressable printhead utilized for depositing developer in image configuration on plain paper or intermediate substrates.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sep. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charge particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller.

Each of the foregoing patents makes use of individually addressable holes to gate toner pixelwise to an imaging member. Key to each of these schemes, as well as the feature which makes each of these printing methods unique, is the method by which toner is presented to the printhead. For example, the '855 patent employs jumping development. There are inherent problems with this (AC jumping) scheme. First, the spacing between the donor roll surface and the print head is very critical. Experiments in the laboratory indicate that <0.001" tolerance is required.

Another problem arises in high speed printing. The donor roll must have a uniform layer of toner on it and requires fast reloading. The tight DEP requirements on a percentage of wrong sign toner requires a very controllable charge distribution on the toner delivered to the printhead. A two component system such as disclosed in U.S. Pat. No. 4,814,796 granted to Fred W. Schmidlin on Mar. 21, 1989 which loads a donor roll helps with the problem of toner charge distribution and other problems peculiar to single component systems but the problem of tolerances between the donor roll and printhead are not solved thereby. Other problems are introduced especially for color two component materials at reasonable print speeds. Since the donor must be reloaded at 100% area coverage for any print area coverage such a system is always running in a stress mode with respect to admix. Also, undeveloped toner must get distributed back onto the carrier beads, a problem which is exacerbated with color developers.

BRIEF DESCRIPTION OF THE INVENTION

A solution to the foregoing problems can be arrived at by treating a DEP printhead in a manner similar to an image pixel on a photoreceptor or electroreceptor surface. Thus, the DEP printhead is developed directly using a two component magnetic brush development system.

The electrostatic fields in the vicinity of the holes or apertures of the printhead structure are of the order of magnitude of image fields encountered in normal xerography. The developed toner does not quench the image field by toner deposition as in normal magnetic brush development enabling the brush to see the same field as long as a hole is in the "on" state. The tolerances between the magnetic brush roll and printhead structure are on the order of usual magnetic brush tolerances.

In a modified form of of the invention, a wrapped condfiguration may be used for a flexible head material. The electrostatics are arranged via appropriate brush biasing to prevent development to the electrode back plane and "off" holes or apertures. For this embodiment a durable coating is necessary on the head to prevent scratching by carrier beads. The bead/hole size ratio is greater than one. Carefully selected magnetic fields prevent toner from scraping off through the hole electrodes.

DETAILED DESCRIPTION OF THE DRAWINGS

DESCRIPTION OF THE PREFERRED EMBODIMENT OF THE INVENTION

Figure 4:
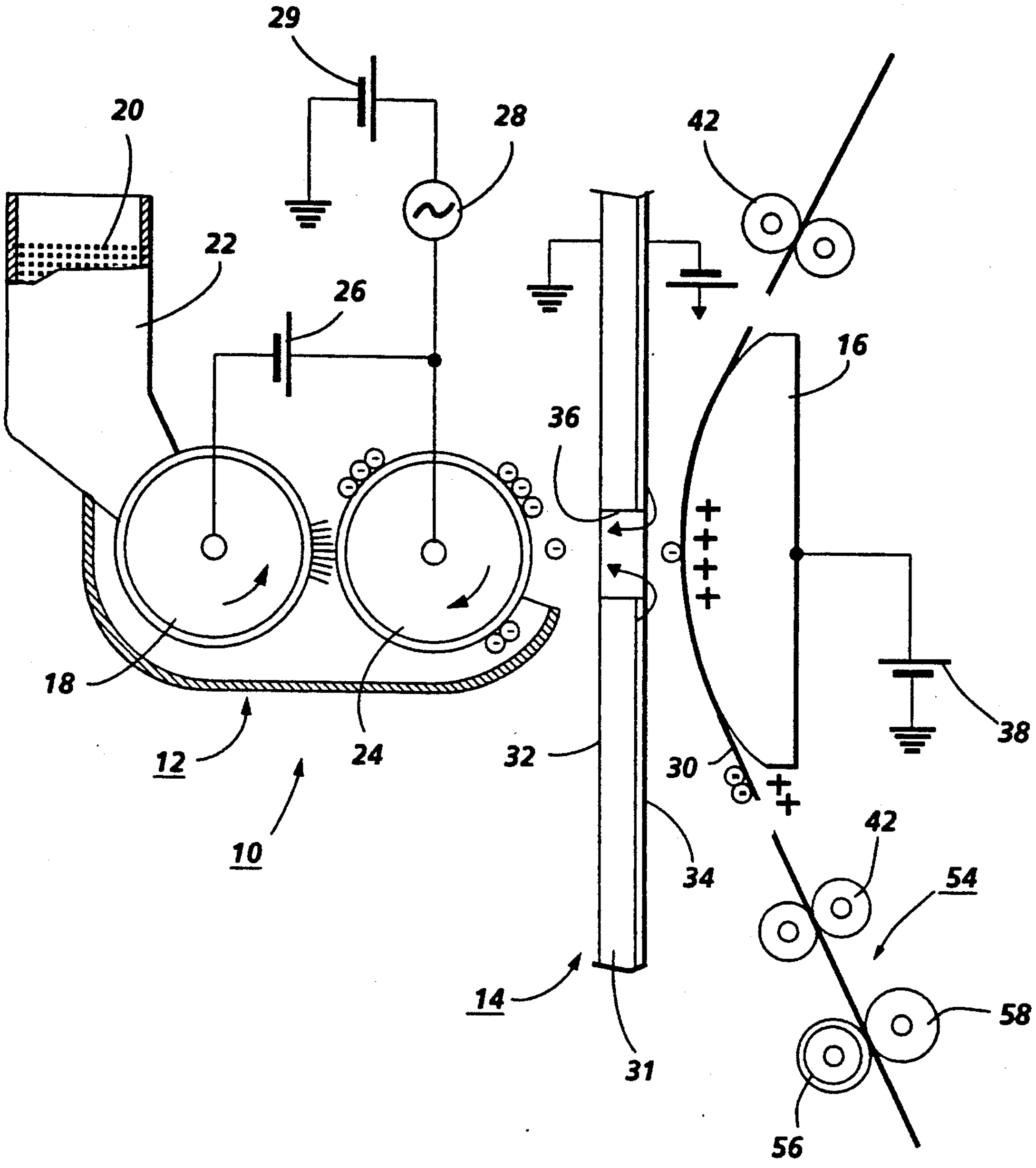
FIG. 4 PRIOR ART
FIG. 4 is a schematic illustration of a prior art DEP printing apparatus representing prior art.

Disclosed in FIG. 4 is an embodiment of a direct electrostatic printing apparatus 10 representing prior art. The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of developer 20 contained in a hopper 22. A developer donor roll 24 is supported for rotation intermediate the magnetic brush 18 and the printhead structure 14. The donor roll structure which is preferably coated with Teflon-S (Trademark of E. I. dupont) is spaced from the printhead approximately 0.003 to 0.015 inch. Teflon-S is a tetrafluoroethylene fluorocarbon polymer that is loaded with carbon black. The magnetic brush has a dc bias of about 100 volts applied thereto via a dc voltage source 26. An AC voltage of about 400 volts provided by source 28 with a dc bias of 20 volts provided by source 29 is applied to the donor roll 24. The applied voltages are effective to cause attraction of developer to the brush 18 and to cause transfer of a monolayer of toner to the donor roll 24 from the brush 18. The monolayer is subsequently jumped to the vicinity of the apertures of the printhead. The 20 volts dc bias precludes collection of right sign toner on the shield electrode of the printhead.

The developer preferably comprises any suitable insulative non-magnetic toner/carrier combination having Aerosil (Trademark of Degussa, Inc.) contained therein in an amount equal to 1/2% by weight and also having zinc stearate contained therein in an amount equal to 1% by weight.

The foregoing developer delivery or supply system provides an improved arrangement for controlling the mass and charge of the toner and, in particular, the percentage of wrong sign toner that is ultimately presented to the printhead 14. The toner/carrier mix used results in favorable charge distribution in the toner. This results in a reduction in the contamination rate of the printhead.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of holes or apertures 36 (only one of which is shown) approximately 0.007 inch in diameter are provided in the layered structure in a pattern suitable for use in recording information. The apertures form an electrode array of individually addressable electrodes. With the shield grounded and zero volts applied to an addressable electrode, toner is propelled through the aperture associated with that electrode. The aperture extends through the base 31 and the conductive layers 32 and 34.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner known in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray, not shown. The sheets of paper are spaced from the printhead 14 a distance in the order of 0.005 to 0.030 inch as they pass thereby. The sheets 30 are transported in contact with the shoe 16 via edge transport roll pairs 42.

During printing the shoe 16 is electrically biased to a dc potential of approximately 400 volts via a dc voltage source 38.

Figure 1:
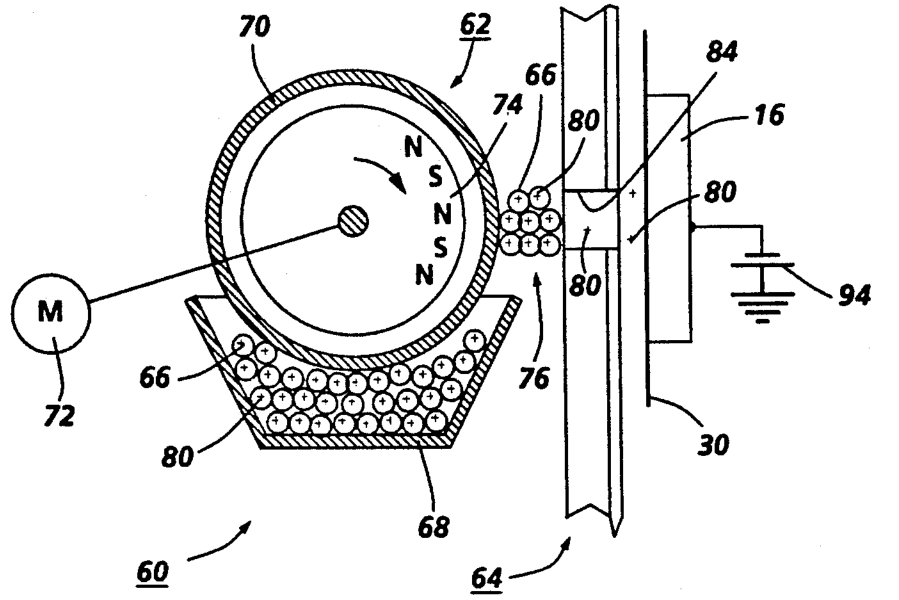
FIG. 1 is a schematic illustration of a DEP printing apparatus according to the invention.

As disclosed in FIG. 1, the DEP printer of the present invention designated 60 comprises a magnetic brush developer roll structure 62 disposed opposite a DEP printhead structure 64 similar to the structure 14. The magnetic brush developer roll 62 transports developer 66 from a supply thereof contained in a sump 68. An outer sleeve 70 is rotated in a clockwise direction by a motor 72 and suitable interconnecting structure, not shown. As the outer sleeve 72 rotates about stationary magnet structure 74 positioned in a development zone 76 carrier beads 78 with toner particles 80 (FIG. 2) carried thereby are formed into a bristle configuration as in conventional magnetic brush development.

Figure 2:
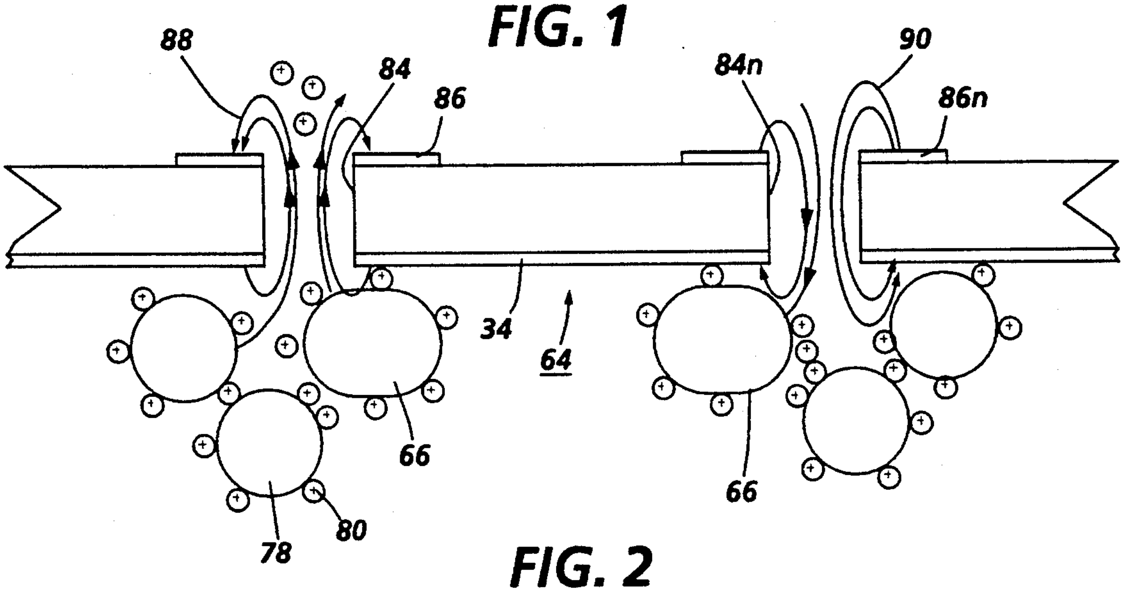
FIG. 2 is a schematic illustration of two component magnetic brush developer and a fragmentary view of a printhead structure illustrating the relationship between the developer and printhead apertures in the on and off state.

The printhead 64 has a plurality of addressable apertures 84 to 84$_n$, two of which are shown in FIG. 2. Aperture 84 illustrates the "On" state of an aperture while aperture 84$_n$ illustrates the "Off" state of an aperture. With a voltage applied to the shield electrode 34 and a voltage applied to the control electrode 86 an electrostatic field 88 is created about the aperture 84 such that toner particles 80 can flow therethrough. With no voltage applied to the control electrode $86_n$, an electrostatic field 90 is created which precludes toner flow through the aperture $84_n$.

Figure 3:
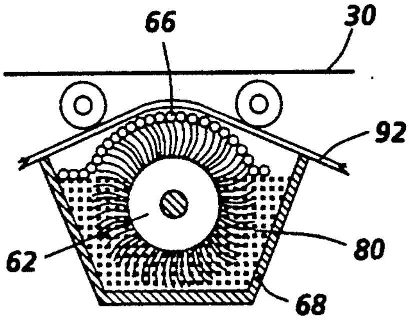
FIG. 3 is a schematic illustration of a modified embodiment of the invention.

A modified form of the invention as depicted in FIG. 3, comprises flexible printhead structure 92. The printhead structure 92 is positioned such that it wraps around the magnetic brush roll. A suitable voltage source, not shown, provides electrostatics for preventing development of the electrode back plane and the "Off" holes or apertures. The printhead is fabricated from polyimide film approximately 0.001 inch thick which is coated with a surface injecting active matrix material to prevent the printhead form being scratched by the carrier beads as well as to prevent charge from building up on the non-electroded portions of the printhead. The carrier bead/aperture ration is greater than one to preclude the beads from passing therethrough.

What is claimed is:

1. Printing apparatus including a toner delivery system, a printhead structure containing a plurality of apertures adapted to transport toner therethrough which toner is supplied by said delivery system to the vicinity of said apertures and means for supporting copy substrates for movement past said printhead, said supporting means being adapted to attract toner transported from said delivery system through said printhead whereby said toner is deposited in image configuration on said copy substrate, the improvement comprising:

magnetic brush developer roll means for presenting a two-component developer mixture directly to said printhead structure without quenching electrostatic fields in the vicinity of the apertures, said developer mixture comprising magnetic carrier and toner particles.

2. Printing apparatus according to claim 1 wherein said printhead structure comprises a flexible member which is positioned such that at least a part of it follows the contour of said developer roll.

3. A method of printing images using a toner delivery system, a printhead structure containing a plurality of apertures adapted to transport toner therethrough which toner is supplied by said delivery system to the vicinity of said apertures and means for supporting copy substrates for movement past said printhead, said supporting means being adapted to attract toner transported from said delivery system through said printhead whereby said toner is deposited in image configuration on said copy substrate, said method including the step of:

presenting a two-component developer mixture, using a magnetic brush developer roll, directly to said printhead structure without quenching electrostatic fields in the vicinity of the apertures, said developer mixture comprising magnetic carrier and toner particles.

4. The method according to claim 3 said including the step of positioning a flexible printhead structure such that at least a part of it follows the contour of said developer roll.

* * * * *